(12) United States Patent
Liu et al.

(10) Patent No.: US 10,599,237 B1
(45) Date of Patent: Mar. 24, 2020

(54) INPUT DEVICE

(71) Applicant: Chicony Electronics Co., Ltd., New Taipei (TW)

(72) Inventors: Chin-Sheng Liu, New Taipei (TW); Ho-Chin Tsai, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 0 days.

(21) Appl. No.: 16/249,887

(22) Filed: Jan. 16, 2019

(30) Foreign Application Priority Data

Oct. 24, 2018 (TW) .............................. 107137615 A

(51) Int. Cl.
G06F 3/0354 (2013.01)

(52) U.S. Cl.
CPC ...... G06F 3/03549 (2013.01); G06F 3/03543 (2013.01)

(58) Field of Classification Search
CPC .... G06F 3/033; G06F 3/0312; G06F 3/03549; G06F 3/03543
See application file for complete search history.

(56) References Cited

U.S. PATENT DOCUMENTS

| | | | | |
|---|---|---|---|---|
| 6,014,130 A * | 1/2000 | Yung-Chou | ......... | G06F 3/03543 250/221 |
| 6,809,727 B2 * | 10/2004 | Piot | ..................... | G06F 3/03543 345/156 |
| 7,443,382 B2 * | 10/2008 | Koo | ....................... | G06F 3/0362 345/163 |
| 7,525,532 B2 * | 4/2009 | Liu | ..................... | G06F 3/03543 345/156 |
| 9,812,273 B2 * | 11/2017 | Breich | ....................... | G05G 1/08 |
| 10,140,008 B2 * | 11/2018 | O'Mahony | ............. | G06F 3/038 |
| 10,409,397 B2 * | 9/2019 | Tsai | ......................... | G06F 3/033 |
| 10,459,543 B2 * | 10/2019 | Zhang | ................. | G06F 3/03543 |
| 2009/0231274 A1 * | 9/2009 | Blandin | ................ | G06F 3/0312 345/156 |
| 2011/0227828 A1 * | 9/2011 | Blandin | .............. | G06F 3/03543 345/163 |
| 2013/0027308 A1 | 1/2013 | Peng | | |

FOREIGN PATENT DOCUMENTS

TW 201305858 A 2/2013

* cited by examiner

Primary Examiner — Ricardo Osorio
(74) Attorney, Agent, or Firm — CKC & Partners Co., LLC

(57) ABSTRACT

An input device includes a housing, a wheel, a mode switch, a carrier, and an abutting assembly. The wheel is rotatably disposed on the housing and capable of rotating relative to the housing based on an axis. The wheel has a first gear structure and a second gear structure. The mode switch is disposed on the housing. The carrier is movably disposed on the housing and engaged with the mode switch. The abutting assembly is disposed on the carrier. While moving to a first position relative to the housing, the carrier switches the mode switch to a first mode and makes the abutting assembly contact the first gear structure. While moving to a second position relative to the housing, the carrier switches the mode switch to a second mode and makes the abutting assembly contact the second gear structure.

16 Claims, 7 Drawing Sheets

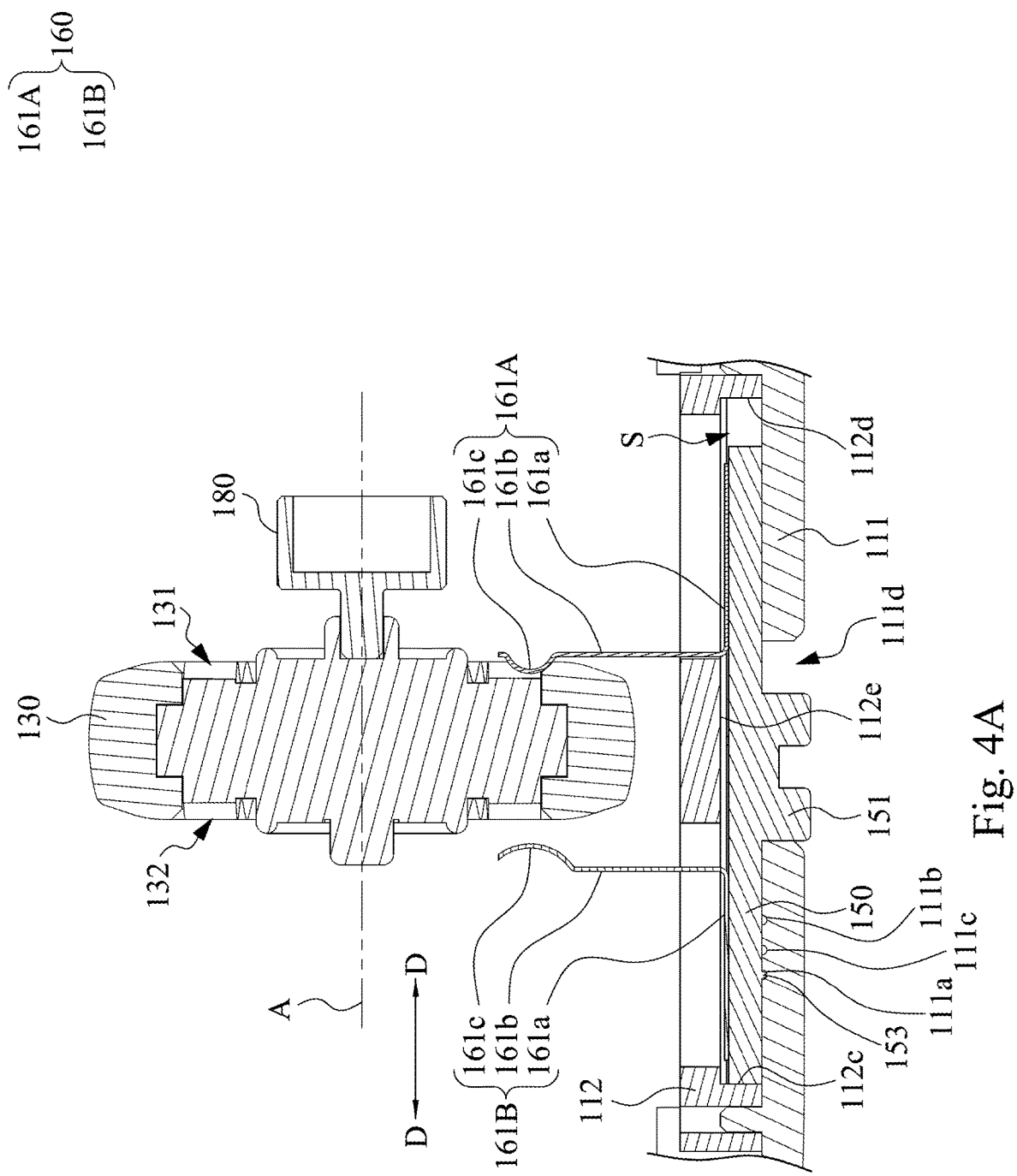

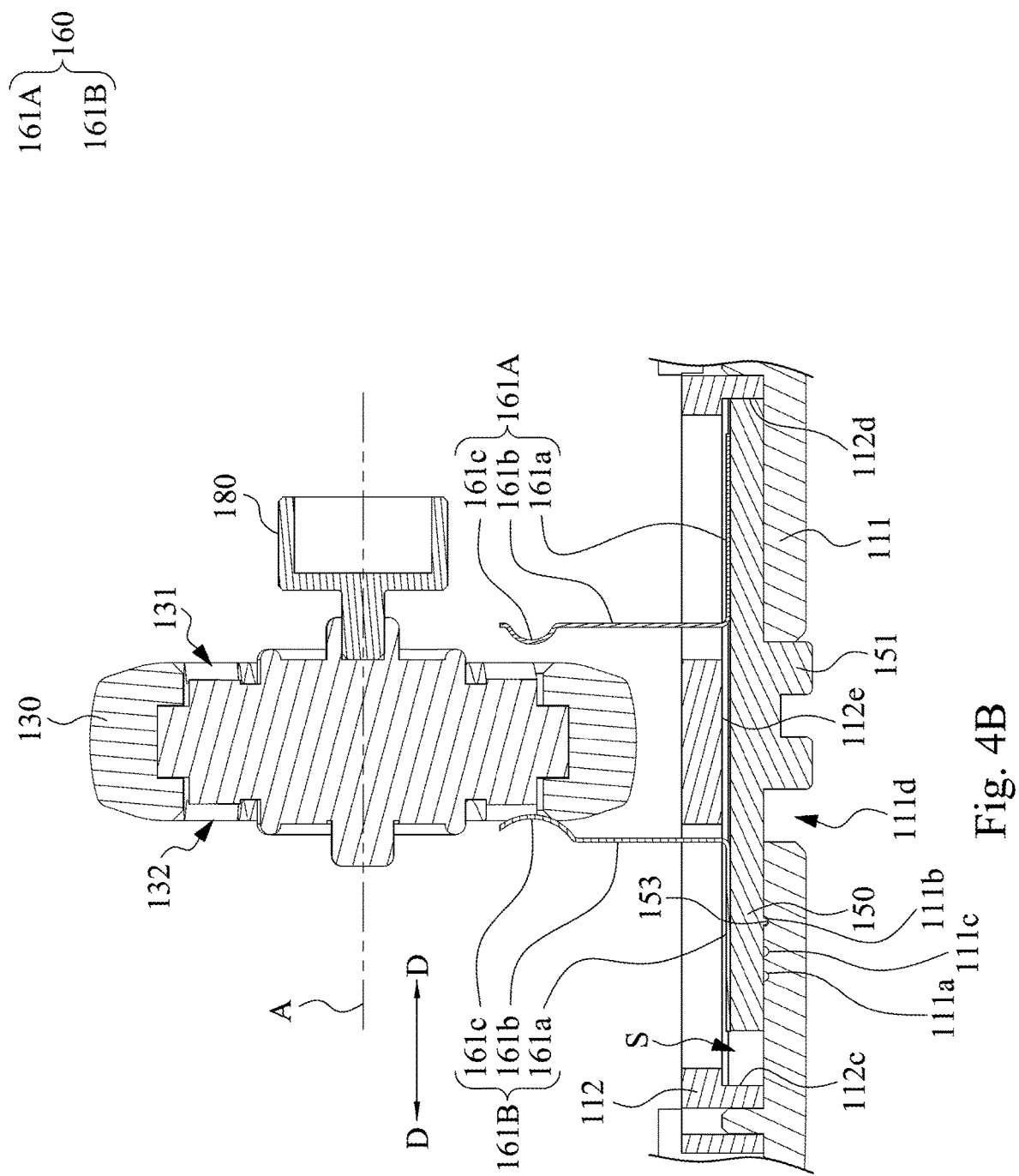

INPUT DEVICE

CROSS-REFERENCE TO RELATED APPLICATION

This application claims priority to Taiwan Application Serial Number 107137615, filed Oct. 24, 2018, which is herein incorporated by reference.

BACKGROUND

Technical Field

The present disclosure relates to an input device, and more particularly, to an input device including a wheel.

Description of Related Art

At present, a mouse is a tool that people often use when they work and play games. There are generally two buttons on the front of the mouse and a wheel in the middle of the two buttons. When a computer screen displays an operation window, rolling the wheel of the mouse will slide the page of the operation window, so as to find the desired content on the page more quickly and accurately.

However, for the existing mouse, the rolling feel and installation tightness of its wheel are adjusted before leaving the factory, resulting in the rolling feel of the wheel to be unadjustable, which cannot meet the needs of individual customers (e.g., different times of stepped feeling, different page distances of the operation window, or the like while rolling the wheel one turn), and the user needs to go back to the operating system or the console to adjust the scrolling data of the wheel. Moreover, the existing mouse does not provide an effective adjustment scheme to the fact that the rolling feel of the wheel may become worse and worse with the use of time. In other words, the wheel of the existing mouse has been unable to meet the growing needs of people.

Accordingly, how to provide an input device to solve the aforementioned problems becomes an important issue to be solved by those in the industry.

SUMMARY

An aspect of the disclosure is to provide an input device that can efficiently solve the aforementioned problems.

According to an embodiment of the disclosure, an input device includes a housing, a wheel, a mode switch, a carrier, and an abutting assembly. The wheel is rotatably disposed on the housing and capable of rotating relative to the housing based on an axis. The wheel has a first gear structure and a second gear structure. The mode switch is disposed on the housing. The carrier is movably disposed on the housing and engaged with the mode switch. The abutting assembly is disposed on the carrier. While moving to a first position relative to the housing, the carrier switches the mode switch to a first mode and makes the abutting assembly contact the first gear structure. While moving to a second position relative to the housing, the carrier switches the mode switch to a second mode and makes the abutting assembly contact the second gear structure.

In an embodiment of the disclosure, the first gear structure and the second gear structure are respectively located at opposite sides of the wheel.

In an embodiment of the disclosure, the abutting assembly includes a first abutting member and a second abutting member. When the carrier is located at the first position, the first abutting member contacts the first gear structure. When the carrier is located at the second position, the second abutting member contacts the second gear structure.

In an embodiment of the disclosure, at least one of the first abutting member and the second abutting member includes a fixing portion, an elastic arm portion, and an abutting portion. The fixing portion is fixed to the carrier. The elastic arm portion is connected to the fixing portion. The abutting portion is connected to the elastic arm portion.

In an embodiment of the disclosure, the fixing portion, the elastic arm portion, and the abutting portion form a metal sheet. The abutting portion is an emboss protruding from the elastic arm portion.

In an embodiment of the disclosure, the housing has an opening. The carrier has a toggle structure exposed from the opening.

In an embodiment of the disclosure, the housing includes a base and a retaining member. The retaining member is disposed on the base and forms a space with the base. The carrier is slidably retained in the space. The abutting assembly passes through the retaining member.

In an embodiment of the disclosure, the retaining member has two guiding surfaces. The carrier is slidably abutted between the two guiding surfaces.

In an embodiment of the disclosure, the retaining member has two abutting surfaces. The carrier abuts against one of the two abutting surfaces when being located at the first position. The carrier abuts against another of the two abutting surfaces when being located at the second position.

In an embodiment of the disclosure, the input device further includes a bracket connected to the housing. The wheel is rotatably connected to the bracket.

In an embodiment of the disclosure, the input device further includes a sensor. The sensor is disposed on the bracket and configured to detect a rotational speed of the wheel.

In an embodiment of the disclosure, each of the first gear structure and the second gear structure includes a plurality of toothed portions. A number of the toothed portions of the first gear structure is different from a number of the toothed portions of the second gear structure.

In an embodiment of the disclosure, the toothed portions of at least one of the first gear structure and the second gear structure radially extend relative to the axis.

In an embodiment of the disclosure, the carrier is configured to move relative to the housing along a direction substantially parallel to the axis.

In an embodiment of the disclosure, the input device further includes a circuit board fixed to the housing. The mode switch includes a main body and a rod. The main body is disposed on the circuit board. The rod is movably connected to the main body and engaged with the carrier.

In an embodiment of the disclosure, the carrier is configured to move relative to the housing along a direction and has two walls. The rod is retained between the two walls in the direction.

In an embodiment of the disclosure, while moving to a third position relative to the housing, the carrier switches the mode switch to a third mode and makes the abutting assembly does not contact the first gear structure and the second gear structure.

Accordingly, in the input device of the present disclosure, by moving the carrier to different positions relative to the housing, the abutting assembly on the carrier can selectively abut against the first gear structure or the second gear structure on the wheel, so that the user can freely choose a number of toothed portions contacted by the abutting assembly while rolling the wheel one turn, thereby getting different rolling feels while rolling the wheel. Moreover, when the abutting assembly abuts the first gear structure and the second gear structure, the carrier switches the mode switch to the first mode and the second mode respectively. On the other hands, the abutting assembly on the carrier can also selectively not abut against the first gear structure or the second gear structure, and the carrier switches the mode switch to the third mode, thereby getting a different rolling feel while rolling the wheel. Therefore, the computer software that cooperates with the input device can further determine, based on the current mode, whether the abutting assembly is currently abutting against the first gear structure or the second gear structure, or is not abutting against the first gear structure and the second gear structure, so as to provide corresponding programming settings.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 4A is a cross-sectional view of the components shown in FIG. 3 taken along line 4A-4A;

FIG. 4B is another cross-sectional view of the components shown in FIG. 3 taken along line 4A-4A;

DETAILED DESCRIPTION

Figure 1:
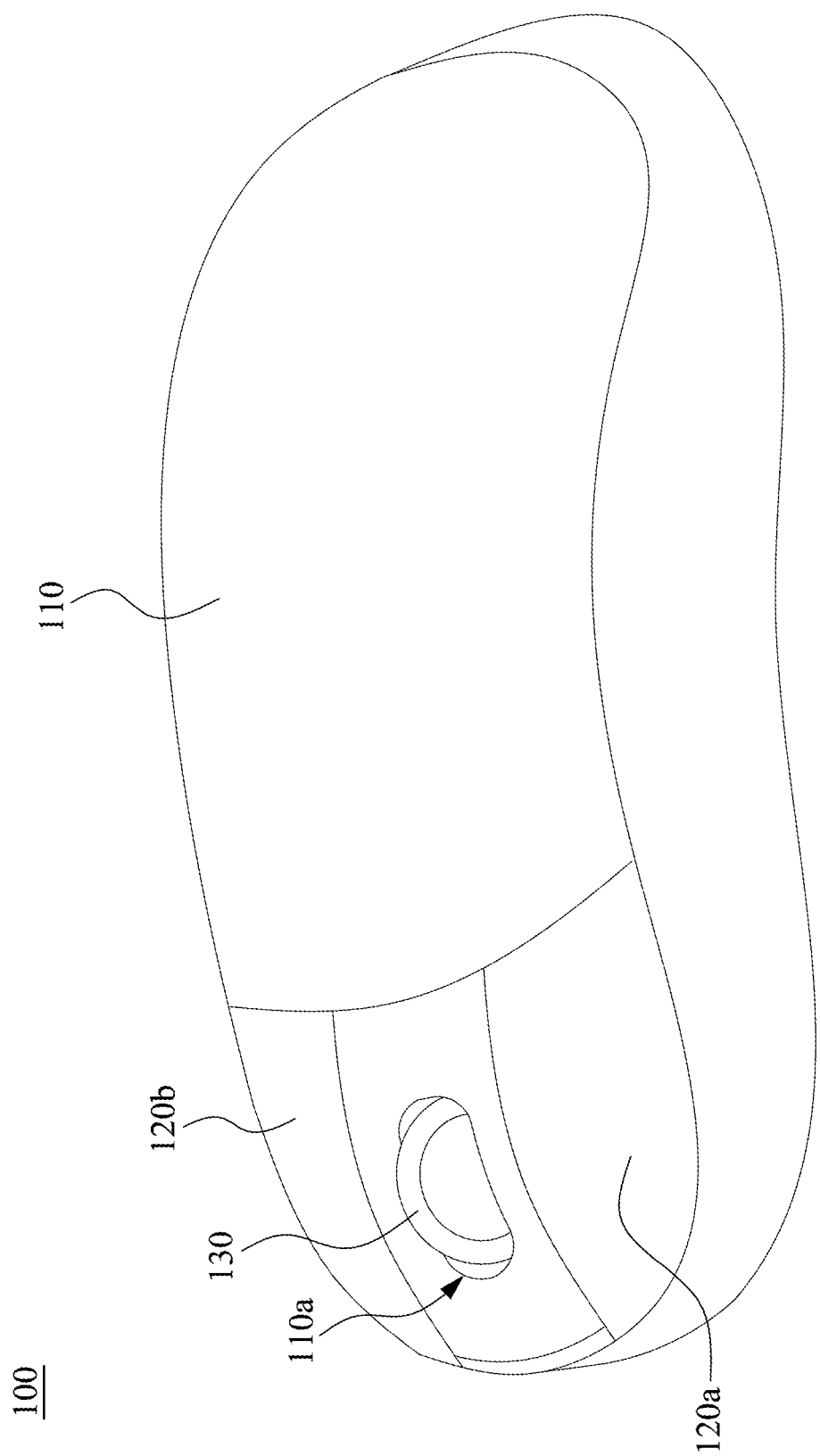
FIG. 1 is a perspective view of an input device according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of an input device 100 according to some embodiments of the disclosure. As shown in FIG. 1, the input device 100 includes a housing 110, buttons 120a, 120b, and a wheel 130. The buttons 120a, 120b are installed on the housing 110 and configured to be pressed by fingers of a user. The housing 110 has an opening 110a. The opening 110a is located between the buttons 120a, 120b. The wheel 130 is disposed in the housing 110, exposed from the opening 110a, and configured to be rolled by the fingers of the user. The input device 100 of the embodiments as illustrated by FIG. 1 is exemplified by a mouse, but the disclosure is not limited in this regard. In practical applications, the input device 100 can be an electronic apparatus such as a keyboard device, a mobile phone, a personal digital assistant, and etc. Structures and functions of some components included in the input device 100 and connection and action relationships among these components are introduced in detail below.

Figure 2:
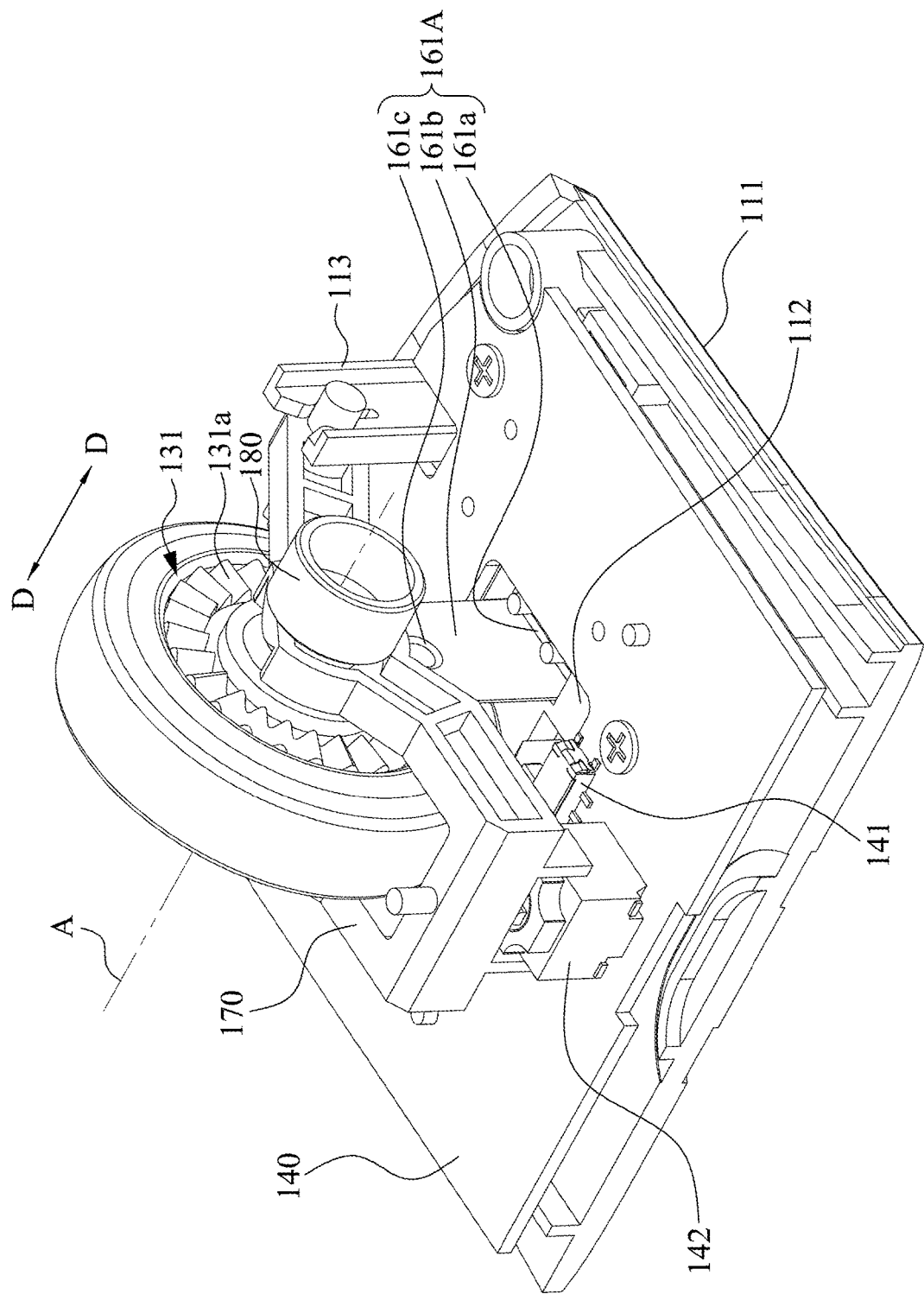
FIG. 2 is a perspective view of some components of the input device shown in FIG. 1.

Reference is made to FIG. 2. FIG. 2 is a perspective view of some components of the input device 100 shown in FIG. 1. In the embodiments as illustrated by FIG. 2, the housing 110 includes a base 111 and two supporting members 113 (another of which can be referred to FIG. 3). The two supporting members 113 are disposed on the base 111. The input device 100 further includes a circuit board 140 and a bracket 170. The circuit board 140 is disposed on the base 111 and includes a mode switch 141 and a pushbutton switch 142. The bracket 170 is substantially U-shaped. Two ends of the bracket 170 are rotatably engaged with supporting members 113 respectively. A central section of the bracket 170 is disposed above the pushbutton switch 142. The wheel 130 is rotatably engaged at an inner side of the bracket 170. With the structural configurations, when a user presses the wheel 130, the bracket 170 will be driven to swing with the two ends engaged with the supporting members 113 as the fulcrum, so as to make the central section of the bracket 170 downwardly press the pushbutton switch 142 to generate a pressing signal.

Figure 3:
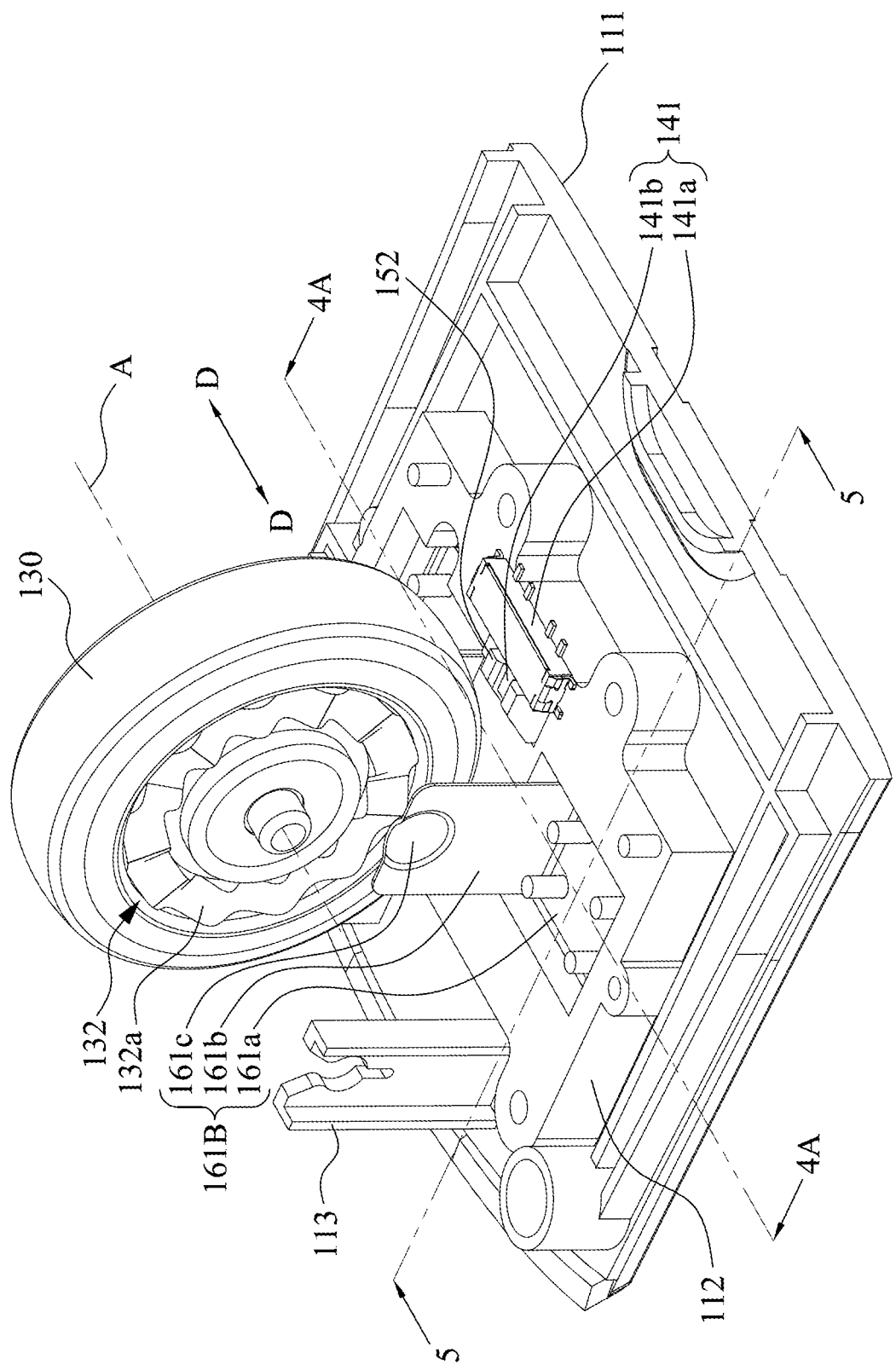
FIG. 3 is another perspective view of some components of the input device shown in FIG. 1.

Reference is made to FIG. 3. FIG. 3 is another perspective view of some components of the input device 100 shown in FIG. 1. In order to clearly illustrate the other components of the input device 100, the circuit board 140, the pushbutton switch 142, and bracket 170 shown in FIG. 2 are omitted in FIG. 3. In the embodiments as illustrated by FIGS. 2 and 3, the wheel 130 has a first gear structure 131 (referring to FIG. 2) and a second gear structure 132 (referring to FIG. 3). The first gear structure 131 and the second gear structure 132 are respectively located at opposite sides of the wheel 130. The first gear structure 131 includes a plurality of toothed portions 131a, and the second gear structure 132 includes a plurality of toothed portions 132a. The wheel 130 engaged with the bracket 170 is configured to rotate relative to the housing 110 based on an axis A. The toothed portions 131a of the first gear structure 131 and the toothed portions 132a of the second gear structure 132 radially extend relative to the axis A (i.e., extending away from the axis A). In addition, the input device 100 further includes a carrier 150 and an abutting assembly 160 (referring to FIG. 4A). The carrier 150 is movably disposed on the base 111 of the housing 110 and engaged with the mode switch 141.

Reference is made to FIGS. 4A and 4B. FIG. 4A is a cross-sectional view of the components shown in FIG. 3 taken along line 4A-4A. FIG. 4B is another cross-sectional view of the components shown in FIG. 3 taken along line 4A-4A. In the embodiments as illustrated by FIGS. 4A and 4B, the carrier 150 is configured to move between a first position (as the position of the carrier 150 shown in FIG. 4A) and a second position (as the position of the carrier 150 shown in FIG. 4B) relative to the base 111 of the housing 110. While moving to the first position relative to the base 111, the carrier 150 switches the mode switch 141 to a first mode and makes the abutting assembly 160 contact the first gear structure 131. While moving to the second position relative to the base 111, the carrier 150 switches the mode switch 141 to a second mode and makes the abutting assembly 160 contact the second gear structure 132.

Figure 4C:
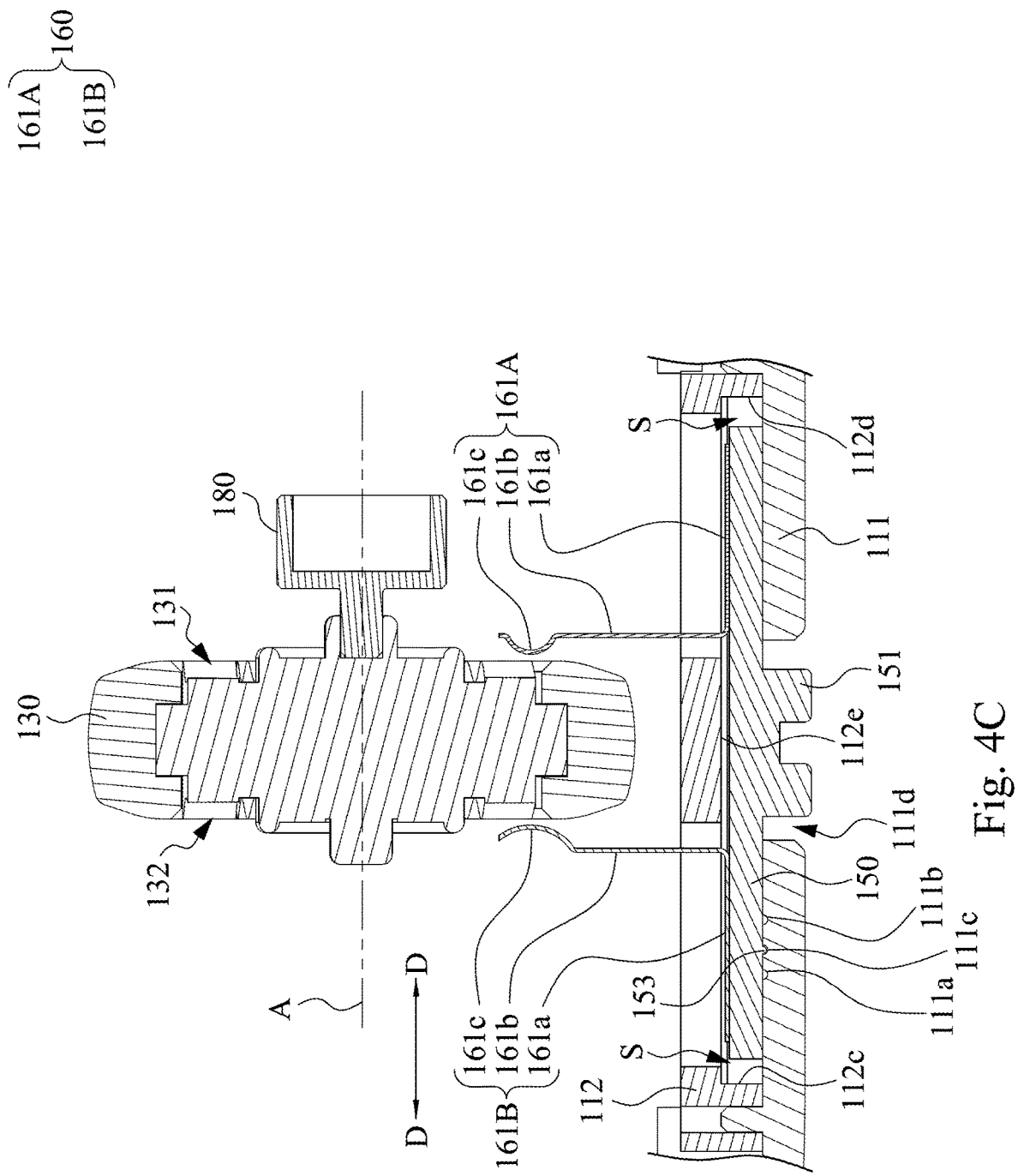
FIG. 4C is another cross-sectional view of the components shown in FIG. 3 taken along line 4A-4A.

Reference is made to FIG. 4C. FIG. 4C is another cross-sectional view of the components shown in FIG. 3 taken along line 4A-4A. In the embodiments as illustrated by FIGS. 3 and 4C, the carrier 150 is configured to move to a third position relative to the base 111 of the housing 110 as shown in FIG. 4C. While moving to the third position relative to the base 111, the carrier 150 switches the mode switch 141 to a third mode and makes the abutting assembly 160 does not contact the first gear structure 131 and the second gear structure 132. It should be noted that the third position is between the first position and the second position.

In some embodiments as illustrated by FIGS. 4A and 4B, the abutting assembly 160 includes a first abutting member 161A and a second abutting member 161B. The first abutting member 161A and the second abutting member 161B are located at the opposite sides of the wheel 130 respectively. When the carrier 150 is located at the first position (referring to FIG. 4A), the first abutting member 161A contacts the first gear structure 131. When the carrier is located at the second position (referring to FIG. 4B), the second abutting member 161B contacts the second gear structure 132.

In some embodiments as illustrated by FIG. 4C, when the carrier is located at the third position, the first abutting member 161A does not contact the first gear structure 131 and the second abutting member 161B does not contact the second gear structure 132.

Specifically, each of the first abutting member 161A and the second abutting member 161B includes a fixing portion 161a, an elastic arm portion 161b, and an abutting portion 161c. The fixing portion 161a is fixed to the carrier 150. The elastic arm portion 161b is connected to the fixing portion 161a. The abutting portion 161c is connected to the elastic arm portion 161b. The abutting portion 161c of the first abutting member 161A is configured to abut against the first gear structure 131. The elastic arm portion 161b of the first abutting member 161A makes the abutting portion 161c of the first abutting member 161A continuously abut against the first gear structure 131. Therefore, when the abutting portion 161c of the first abutting member 161A abuts against the first gear structure 131 and the wheel 130 rotates, the abutting portion 161c of the first abutting member 161A will sequentially slide through the toothed portions 131a of the first gear structure 131. Similarly, the abutting portion 161c of the second abutting member 161B is configured to abut against the second gear structure 132. The elastic arm portion 161b of the second abutting member 161B makes the abutting portion 161c of the second abutting member 161B continuously abut against the second gear structure 132. Therefore, when the abutting portion 161c of the second abutting member 161B abuts against the second gear structure 132 and the wheel 130 rotates, the abutting portion 161c of the second abutting member 161B will sequentially slide through the toothed portions 132a of the second gear structure 132.

In some embodiments, a number of the toothed portions 131a of the first gear structure 131 is different from a number of the toothed portions 132a of the second gear structure 132. For example, the number of the toothed portions 131a of the first gear structure 131 is twenty-four, and the number of the toothed portions 132a of the second gear structure 132 is twelve, but the disclosure is not limited in this regard and can be flexibly adjusted.

With the foregoing structural configurations, the abutting assembly 160 on the carrier 150 can selectively abut against the first gear structure 131 or the second gear structure 132 on the wheel 130, so that the user can freely choose the number of toothed portions contacted by the abutting assembly 160 while rolling the wheel 130 one turn, thereby getting different rolling feels while rolling the wheel 130. For example, since the number of the toothed portions 131a of the first gear structure 131 is greater, a distance between any adjacent two of the toothed portions 131a of the first gear structure 131 is smaller, such that the abutting portion 161c of the first abutting member 161A can smoothly slide through the toothed portions 131a of the first gear structure 131, and the user can get a more ambiguous stepped feeling while rolling the wheel 130. Relatively, since the number of the toothed portions 132a of the second gear structure 132 is smaller, a distance between any adjacent two of the toothed portions 132a of the second gear structure 132 is greater, such that the abutting portion 161c of the second abutting member 161B slides through the toothed portions 132a of the second gear structure 132 with a greater obstructed feeling, and the user can get a clearer stepped feeling while rolling the wheel 130.

In practical applications, in order to adjust the stepped feeling of rolling the wheel 130, in addition to the number of the toothed portions 131a of the first gear structure 131 and the toothed portions 132a of the second gear structure 132, it is also conceivable to adjust the height of the toothed portions 131a of the first gear structure 131 and/or the height of the toothed portions 132a of the second gear structure 132, or the shape of the abutting portion 161c of the first abutting member 161A and/or the shape of the abutting portion 161c of the second abutting member 161B.

In some embodiments, as shown in FIGS. 4A and 4B, the fixing portion 161a, the elastic arm portion 161b, and the abutting portion 161c of each of the first abutting member 161A and the second abutting member 161B form a metal sheet. The abutting portion 161c is an emboss protruding from the elastic arm portion 161b. In other words, each of the first abutting member 161A and the second abutting member 161B can be made from a metal sheet through a stamping process, but the disclosure is not limited in this regard.

In some embodiments, the first abutting member 161A and the second abutting member 161B can share the same fixing portion 161a, so that the abutting assembly 160 is a one-piece component with a U-shaped appearance.

In some embodiments, as shown in FIG. 3, the mode switch 141 includes a main body 141a and a rod 141b. The main body 141a is disposed on the circuit board 140 (referring to FIG. 2). The rod 141b is movably connected to the main body 141a and engaged with the carrier 150. On the other hand, the carrier 150 is configured to move relative to the housing 110 along a direction D and has two walls 152 (only one of which is representatively labeled). The rod 141b is retained between the two walls 152 in the direction D. With the structural configurations, when the carrier 150 moves to the first position relative to the base 111, one of the walls 152 on the carrier 150 can push the rod 141b to switch the mode switch 141 to the first mode. When the carrier 150 moves to the second position relative to the base 111, another of the walls 152 on the carrier 150 can push the rod 141b to switch the mode switch 141 to the second mode. In other words, the mode switch 141 is a slide switch, so as to generate different switching signals when the rod 141b thereof is pushed by the walls 152 on the carrier 150 to different positions respectively.

With the foregoing structural configurations, the computer software that cooperates with the input device 100 can further determine, based on the current mode, whether the abutting assembly 160 is currently abutting against the first gear structure 131 or the second gear structure 132, or is not abutting against the first gear structure 131 and the second gear structure 132. For example, in the first mode, when the user rolls the wheel 130 and makes the abutting portion 161c of the first abutting member 161A to pass through a toothed portion 131a of the first gear structure 131, a setting of the computer software that cooperates with the input device 100 causes the page of the operation window to move a small distance (e.g., scroll a line of words); in the second mode, when the user rolls the wheel 130 and makes the abutting portion 161c of the second abutting member 161B to pass through a toothed portion 132a of the second gear structure 132, a setting of the computer software that cooperates with the input device 100 causes the page of the operation window to move a large distance (e.g., scroll two lines of words); and in the third mode, when the user rolls the wheel 130 and makes the abutting portion 161c of the first abutting member 161A does not pass through a toothed portion 131a of the first gear structure 131 and the abutting portion 161c of the second abutting member 161B does not pass through a toothed portion 132a of the second gear structure 132, a setting of the computer software that cooperates with the input device 100 causes the page of the operation window to move a greater distance (e.g., quickly scroll multiple lines of words).

In some embodiments, the direction D along which the carrier 150 moves relative to the housing 110 substantially parallel to the axis A, but the disclosure is not limited in this regard. In practical applications, the moving path of the carrier 150 relative to the housing 110 may not be straight (e.g., an arc).

In some embodiments, as shown in FIGS. 3 to 4B, the input device 100 further includes a sensor 180. The sensor 180 can be a magnetic, optical, or rotary sensor, but the disclosure is not limited in this regard. The sensor 180 is disposed on the bracket 170 and configured to detect a rotational speed of the wheel 130. Specifically, the sensor 180 passes through the bracket 170 to be engaged with the wheel 130. When the wheel 130 rotates, the sensor 180 is synchronously rotated, thus generating a corresponding signal to the computer software that cooperates with the input device 100, but the disclosure is not limited in this regard.

In some embodiments, as shown in FIGS. 4A and 4B, the housing 110 further includes a retaining member 112. The retaining member 112 is disposed on the base 111 and forms a space S with the base 111. The carrier 150 is slidably retained in the space S. The abutting assembly 160 passes through the retaining member 112. The retaining member 112 has two abutting surfaces 112c, 112d. The two abutting surfaces 112c, 112d are respectively located at opposite sides of the retaining member 112 and face each other. The carrier 150 abuts against the abutting surface 112c when being located at the first position. The carrier 150 abuts against the abutting surface 112d when being located at the second position. As such, by abutting against the two abutting surfaces 112c, 112d of the retaining member 112, the carrier 150 can precisely move to the first position and the second position relative to the base 111 respectively.

In some alternative embodiments, as shown in FIGS. 4A and 4B, the carrier 150 has a protrusion 153 at the bottom surface thereof, and the base 111 has two recesses 111a, 111b at the top surface thereof. When the carrier 150 is located at the first position, the protrusion 153 is engaged with the recess 111a. When the carrier 150 is located at the second position, the protrusion 153 is engaged with the recess 111b. As such, by engaging the protrusion 153 with the two recesses 111a, 111b, the carrier 150 can also precisely move to the first position and the second position relative to the base 111 respectively.

In some embodiments, as shown in FIG. 4C with reference to FIG. 3, the base 111 further has a recess 111c at the top surface thereof. When the carrier 150 moves relative to the base 111 to make the protrusion 153 be engaged with the recess 111c, the carrier 150 can be precisely positioned at the third position relative to the base 111.

In some embodiments, the protrusion 153 of the carrier 150 can be modified to be a recess, and the recesses 111a, 111b, 111c of the base 111 can be correspondingly modified to be protrusions.

In some embodiments, it can be designed that the movement of the rod 141b relative to the main body 141a produces a stepped sense of positioning, so as to correspond the state in which the mode switch 141 is switched to the third mode. For example, it can be designed that the two walls 152 on the carrier 150 do not contact the rod 141b when the mode switch 141 is switched to the third mode, but the disclosure is not limited in this regard.

In addition, as shown in FIG. 4C, the carrier 150 does not abut against the abutting surface 112c and the abutting surface 112d when being located at the third position.

On the other hand, as shown in FIGS. 4A and 4B, the base 111 of the housing 110 has an opening 111d. The carrier 150 has a toggle structure 151. The toggle structure 151 is exposed from the opening 111d. As such, the user can move the toggle structure 151 exposed from the opening 111d by a finger to move the carrier 150 relative to the base 111. Moreover, when the carrier 150 moves to the first position and the second position relative to the base 111, the toggle structure 151 abuts against opposite edges of the opening 111d respectively. It can be seen that the opening 111d can also assist the carrier 150 to be precisely positioned at the first position and the second position relative to the base 111. In addition, as shown in FIG. 4C, when the carrier 150 moves to the third position relative to the base 111, the toggle structure 151 does not abut against the opposite edges of the opening 111d.

Figure 5:
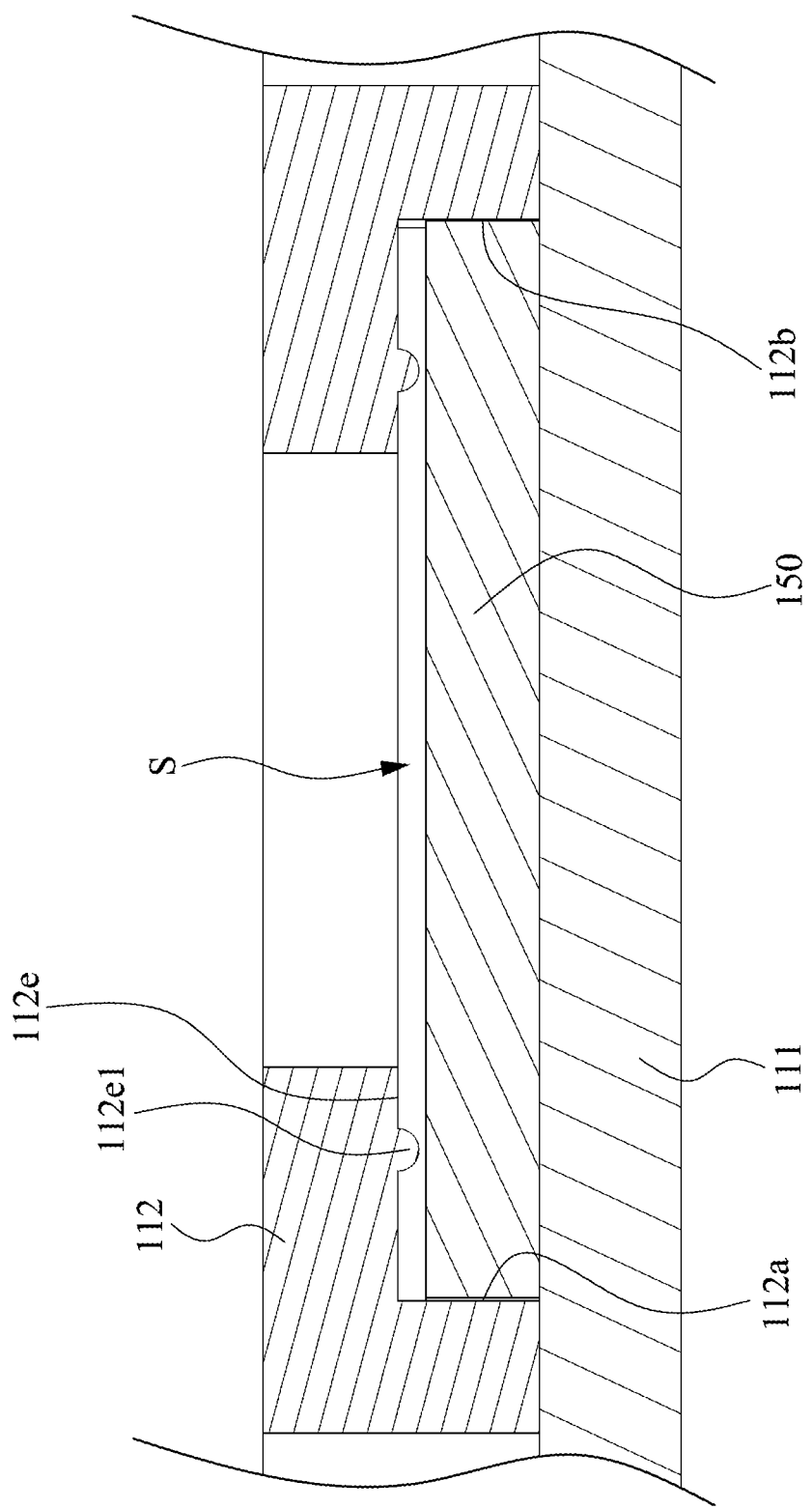
FIG. 5 is a cross-sectional view of the components shown in FIG. 3 taken along line 5-5.

Reference is made to FIG. 5. FIG. 5 is a cross-sectional view of the components shown in FIG. 3 taken along line 5-5. In the embodiments as illustrated by FIG. 5, the retaining member 112 further has two guiding surfaces 112a, 112b. The two guiding surfaces 112a, 112b are respectively located at opposite sides of the retaining member 112 and face each other. The two guiding surfaces 112a, 112b are connected to the two abutting surfaces 112c, 112d around. The carrier 150 is slidably abutted between the two guiding surfaces 112a, 112b. In other words, the carrier 150 can slide relative to the base 111 along the direction D by the two guiding surfaces 112a, 112b.

In the embodiments as illustrated by FIG. 5, the retaining member 112 further has a retaining surface 112e. The carrier 150 is retained between the base 111 and the retaining surface 112e. As such, the retaining member 112 can retain the carrier 150 by the retaining surface 112e, so as to prevent the carrier 150 from leaving the base 111. Furthermore, the retaining surface 112e has a protrusion 112e1 thereon. The protrusion 112e1 protrudes toward the base 111 and is configured to contact the carrier 150. As such, during the sliding of the carrier 150 between the base 111 and the retaining surface 112e, the contact area between the retaining surface 112e and the carrier 150 can be reduced by the protrusion 112e1, so as to increase the smoothness of the carrier 150 while sliding.

In practical applications, the retaining member 112 can also be replaced with a sliding rail structure. The carrier 150 is right located at the first position and the second position when sliding to two ends of the sliding rail structure respectively.

According to the foregoing recitations of the embodiments of the disclosure, it can be seen that in the input device of the present disclosure, by moving the carrier to different positions relative to the housing, the abutting assembly on the carrier can selectively abut against the first gear structure or the second gear structure on the wheel, so that the user can freely choose a number of toothed portions contacted by the abutting assembly while rolling the wheel one turn, thereby getting different rolling feels while rolling the wheel. Moreover, when the abutting assembly abuts the first gear structure and the second gear structure, the carrier switches the mode switch to the first mode and the second mode respectively. On the other hands, the abutting assembly on the carrier can also selectively not abut against the first gear structure or the second gear structure, and the carrier switches the mode switch to the third mode, thereby getting a different rolling feel while rolling the wheel. Therefore, the computer software that cooperates with the input device can further determine, based on the current mode, whether the abutting assembly is currently abutting against the first gear structure or the second gear structure, or is not abutting against the first gear structure and the second gear structure, so as to provide corresponding programming settings.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An input device, comprising:
   a housing;
   a wheel rotatably disposed on the housing and capable of rotating relative to the housing based on an axis, the wheel having a first gear structure and a second gear structure respectively located at opposite sides of the wheel;
   a mode switch disposed on the housing;
   a carrier movably disposed on the housing and engaged with the mode switch; and
   an abutting assembly disposed on the carrier,
   wherein while moving to a first position relative to the housing, the carrier switches the mode switch to a first mode and makes the abutting assembly contact the first gear structure, and while moving to a second position relative to the housing, the carrier switches the mode switch to a second mode and makes the abutting assembly contact the second gear structure.

2. The input device of claim 1, wherein the abutting assembly comprises a first abutting member and a second abutting member, when the carrier is located at the first position, the first abutting member contacts the first gear structure, and when the carrier is located at the second position, the second abutting member contacts the second gear structure.

3. The input device of claim 2, wherein at least one of the first abutting member and the second abutting member comprises:
   a fixing portion fixed to the carrier;
   an elastic arm portion connected to the fixing portion; and
   an abutting portion connected to the elastic arm portion.

4. The input device of claim 3, wherein the fixing portion, the elastic arm portion, and the abutting portion form a metal sheet, and the abutting portion is an emboss protruding from the elastic arm portion.

5. The input device of claim 1, wherein the housing has an opening, and the carrier has a toggle structure exposed from the opening.

6. The input device of claim 1, wherein the housing comprises:
   a base; and
   a retaining member disposed on the base and forming a space with the base, wherein the carrier is slidably retained in the space, and the abutting assembly passes through the retaining member.

7. The input device of claim 6, wherein the retaining member has two guiding surfaces, and the carrier is slidably abutted between the two guiding surfaces.

8. The input device of claim 6, wherein the retaining member has two abutting surfaces, the carrier abuts against one of the two abutting surfaces when being located at the first position, and the carrier abuts against another of the two abutting surfaces when being located at the second position.

9. The input device of claim 1, further comprising a bracket connected to the housing, wherein the wheel is rotatably connected to the bracket.

10. The input device of claim 9, further comprising a sensor disposed on the bracket and configured to detect a rotational speed of the wheel.

11. The input device of claim 1, wherein each of the first gear structure and the second gear structure comprises a plurality of toothed portions, and a number of the toothed portions of the first gear structure is different from a number of the toothed portions of the second gear structure.

12. The input device of claim 11, wherein the toothed portions of at least one of the first gear structure and the second gear structure radially extend relative to the axis.

13. The input device of claim 1, wherein the carrier is configured to move relative to the housing along a direction substantially parallel to the axis.

14. The input device of claim 1, further comprising a circuit board fixed to the housing, wherein the mode switch comprises:
   a main body disposed on the circuit board; and
   a rod movably connected to the main body and engaged with the carrier.

15. The input device of claim 14, wherein the carrier is configured to move relative to the housing along a direction and has two walls, and the rod is retained between the two walls in the direction.

16. The input device of claim 1, wherein while moving to a third position relative to the housing, the carrier switches the mode switch to a third mode and makes the abutting assembly does not contact the first gear structure and the second gear structure.

* * * * *